3,658,768
PROCESS FOR POLYMERIZATION OF
PIVALOLACTONE
Merlin P. Harvey, Passaic, and Douglas I. Relyea, Pompton Plains, N.J., assignors to Uniroyal, Inc., New York, N.Y.
No Drawing. Filed Apr. 24, 1970, Ser. No. 31,772
Int. Cl. C08g *17/017*
U.S. Cl. 260—78.3 R                5 Claims

ABSTRACT OF THE DISCLOSURE

The invention resides in a novel catalyst system used for the polymerization of pivalolactone. These catalysts or initiators are produced from polybasic acids and quaternary ammonium salts.

---

This invention relates to a novel method of enhancing the polymerization of pivalolactone so as to achieve a high molecular weight, spinnable polyester. Pivalolactone polymerizes in the presence of a suitable initiator or catalyst to form polypivalolactone, a polymer of high utility for preparing textile fibers adaptable for a wide variety of uses.

It is well known that pivalolactone can be made to polymerize by a ring-opening reaction to form a polyester. This reaction, depicted below, has been promoted in the past by the use of various mono-functional initiators or catalysts:

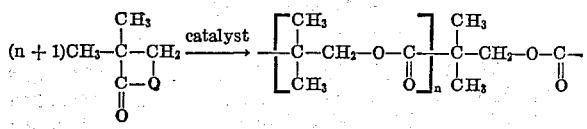

Most commonly used catalysts are the organic sulfides, sulfoxides and sulfonium derivatives as set forth in British Pat. 1,096,899. The phosphines, tertiary amines and many monoquaternary ammonium compounds, such as tetrabutylammonium hydroxide, tetrabutylammonium bromide, tetraheptylammonium iodide, and tetraethyl ammonium chloride have all been utilized at one time or another as catalysts for pivalolactone polymerization reactions. The concentration of these initiators or catalysts is usually in the range of about 0.01–1.0 mol percent, based on the pivalolactone.

We have determined that the use of a small amount of a bis(ammonium salt) catalyst or initiator will increase the rate of polymerization to a rate much faster than that obtainable with the mono(ammonium salt)catalyst. We have also determined that the use of the bis, tris or tetrakis ammonium salt will provide a greater conversion to polymer as well as a final polymer of much higher molecular weight. It has been determined, that by the use of a bis (ammonium salt) initiator, we have achieved an estimated 50-fold increase in the polymerization rate of the pivalolactone. It has also been determined that the new catalyst is effective in ranges far below those used with the mono (ammonium salt) catalysts. In fact, significant results have been obtained using the catalyst in amounts of from 0.0001 mol percent to 0.1 mol percent based upon the pivalolactone.

The general formula for our new catalyst is:

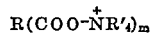

where R is selected from the group consisting of an aryl radical of 6–10 carbon atoms, an alkyl radical of 1–7 carbon atoms, an alicyclic radical of 3–6 carbon atoms and an aza substituted hydrocarbon radical of 4–12 carbon and nitrogen atoms; R' is selected from the group consisting of methyl, ethyl, n-propyl, n-butyl and benzyltrimethyl, and $m$ is 2–6.

Various carboxylic acids which may be utilized in producing these catalysts are:

Dimethylmalonic acid
3,3-dimethylglutaric acid
1,1-cyclobutanedicarboxylic acid
trans-1,4-cyclohexanedicarboxylic acid
tetramethylterephthalic acid
1,2,3-propanetricarboxylic acid (carballylic acid)
1,3,5-benzenetricarboxylic acid
Nitrilotriacetic acid
Aconitic acid
Pyromellitic acid
1,2,3,4-butanetetracarboxylic acid
1,4,5,8-naphthalenetetracarboxylic acid
Ethylenedinitrilotetraacetic acid
3,3-dimethyl-2,2,4,4-pentanetetracarboxylic acid
Diethylenetriaminepentaacetic acid
Mellitic acid Each of these acids is completely neutralized with a quaternary ammonium hydroxide which may be chosen from any of the following, but are not limited to this group:

Tetramethylammonium hydroxide,
Tetraethylammonium hydroxide,
Tetra-n-propylammonium hydroxide,
Tetra-n-butylammonium hydroxide and
Benzyltrimethylammonium hydroxide The following examples will serve to illustrate our invention, however they are not intended to be limitative.

EXAMPLE I

The following example describes the preparation of one of the new catalysts.

Preparation of bis(tetra-n-butylammonium) dimethylmalonate

Methanolic tetra-n-butylammonium hydroxide (Eastman Kodak Co. #7774) was titrated to determine the exact concentration of the hydroxide. It was found to be a 23.45% solution (0.227 g./ml.). The desired amount of this solution [11.43 ml.; 0.01 mole $(C_4H_9)_4NOH$] was placed in a 125 ml. filter flask and solid dimethylmalonic acid (0.6606 g.; 0.005 mole) was added to it. After thoroughly mixing the solution, the methanol was removed under gradually reduced pressure. Thereafter the pressure was maintained at 0.3–0.8 mm. for six hours. Crystallization of tetra-n-butylammonium dimethylmalonate began within 2–3 hours after the pressure was reduced to 0.3–0.8 mm. and gave a quantitative yield. The product is very hygroscopic, and may be stored in a desiccator over phosphorus pentoxide before use.

EXAMPLE II

The following example illustrates the use of bis(tetra-n-butylammonium) dimethylmalonate as a catalyst for polymerization of pivalolactone and shows its unexpected superiority to tetra-n-butylammonium pivalate under conditions which lead to identical molecular weights.

Dry, heavy-walled test tubes having a volume of about 50 ml. and closed with a tight-fitting perforated metal cap with rubber liner through which catalyst solution could be injected were charged as follows:

| | | |
|---|---|---|
| Pivalolactone, millimoles | 50 | 30 |
| Anhydrous ethyl acetate, ml | 6 | 3.6 |
| Bis(tetra-n-butylammonium)dimethylmalonate, micromoles | 0.182 | |
| Tetra-n-butylammonium pivalate, micromoles | | 0.218 |
| Monomer: catalyst molar ratio | 274,000:1 | 137,000:1 |
| Time, hours | 72 | 54 |
| Temp., °C | 25 | 60 |
| Polymer weight, g | 4.7 | 1.9 |
| Conversion to polymer, percent | 94 | 63 |
| Polymer intrinsic viscosity | 3.25 | 3.26 |

EXAMPLE III

This example shows the superiority of bis(tetra-n-butylammonium) dimethylmalonate over tetra-n-butylammonium pivalate under conditions where the two catalysts are used at equal monomer:catalyst ratios.

| | | |
|---|---|---|
| Pivalolactone, millimoles | 50 | 30 |
| Anhydrous ethyl acetate, ml | 6.0 | 3.6 |
| Bis(tetra-n-butylammonium)dimethylmalonate, micromoles | 0.182 | |
| Tetra-n-butylammonium pivalate, micromoles | | 0.109 |
| Monomer: catalyst ratio | 274,000:1 | 274,000:1 |
| Time, hours | 72 | 78 |
| Temp., °C | 25 | 60 |
| Polymer weight, g | 4.7 | 1.2 |
| Conversion to polymer, percent | 94 | 40 |
| Polymer intrinsic viscosity | 3.25 | 1.70 |

Even though more favorable conditions of time and temperature were used for the monoammonium salt, less polymer of lower molecular weight was formed with this catalyst. It is estimated that the polymerization initiated by the bis(ammonium salt) is fifty times faster and leads to polymer of three times higher molecular weight than that initiated by the monoammonium salt.

EXAMPLE IV

This example shows the utility of tetrakis(tetra-n-butylammonium) 1,2,3,4-butanetetracarboxylate as an initiator of pivalolactone polymerization.

| | |
|---|---|
| Pivalolactone, millimoles | 50 |
| Anhydrous ethyl acetate, ml. | 7.3 |
| Tetrakis(tetra-n-butylammonium) 1,2,3,4-butanetetracarboxylate, micromoles | 27.3 |
| Time, hours | 24 |
| Temperature, °C. | 15 |
| Polymer weight, g. | 4.8 |
| Conversion to polymer, percent | 96 |
| Polymer intrinsic viscosity | 1.90 |

Having thus described our invention, what we claim and desire to protect by Letters Patent is:

1. A process for polymerizing pivalolactone, which comprises polymerizing said pivalolactone in the presence of an initiator of the following formula:

$$R(COO^-NR'_4)_m$$

where R is selected from the group consisting of an aryl radical of 6–10 carbon atoms, an alkyl radical of 1–7 carbon atoms, an alicyclic hydrocarbon radical of 3–6 carbon atoms and an aza substituted hydrocarbon radical of 4–12 carbon and nitrogen atoms; R' is selected from the group consisting of methyl, ethyl, n-propyl, n-butyl and benzyltrimethyl, and $m$ is 2–6.

2. The process of claim 1, wherein the initiator is bis(tetra-n-butylammonium) dimethyl malonate.

3. The process of claim 1, wherein the initiator is tetrakis(tetra-n-butylammonium) 1,2,3,4-butanetetracarboxylate.

4. A process of polymerizing pivalolactone which comprises the addition to the ring opening reaction mixture of an initiator which is formed by reacting a monomeric polycarboxylic acid with a quaternary ammonium hydroxide, said acid being completely neutralized by the hydroxide and containing a radical attached to the carboxyl groups selected from the group consisting of an aryl radical of 6–10 carbon atoms, an alkyl radical of 1–7 carbon atoms, an alicyclic hydrocarbon radical of 3–6 carbon atoms and an aza substituted hydrocarbon radical of 4–12 carbon or nitrogen atoms.

5. The process of claim 4, wherein the quaternary ammonium hydroxide is selected from the group consisting of tetramethylammonium hydroxide, tetraethylammonium hydroxide, tetra-n-propylammonium hydroxide, tetra-n-butylammonium hydroxide and benzyltrimethylammonium hydroxide.

References Cited

UNITED STATES PATENTS

| | | | |
|---|---|---|---|
| 3,407,181 | 10/1968 | Kierstead | 260—78.3 |
| 3,418,393 | 12/1968 | King | 260—857 |
| 3,518,229 | 6/1970 | Engelhardt | 260—64 |

WILLIAM H. SHORT, Primary Examiner

E. A. NIELSEN, Assistant Examiner